US012599877B2

(12) United States Patent
Minino et al.

(10) Patent No.: US 12,599,877 B2
(45) Date of Patent: Apr. 14, 2026

(54) LIQUID MANURE AGITATION

(71) Applicant: BAZOOKA-FARMSTAR, LLC, Washington, IA (US)

(72) Inventors: Phillip David Minino, Washington, IA (US); John William Green, Brighton, IA (US); Jason Bruce Albright, Wellman, IA (US); Jeremy Dean Vittetoe, Washington, IA (US); Jeffery William Huber, Washington, IA (US)

(73) Assignee: Bazooka-Farmstar, LLC, Washington, IA (US)

(*) Notice: Subject to any disclaimer, the term of this patent is extended or adjusted under 35 U.S.C. 154(b) by 0 days.

(21) Appl. No.: 19/406,390

(22) Filed: Dec. 2, 2025

(65) Prior Publication Data

US 2026/0084122 A1 Mar. 26, 2026

Related U.S. Application Data

(63) Continuation of application No. 18/413,346, filed on Jan. 16, 2024.

(60) Provisional application No. 63/480,064, filed on Jan. 16, 2023.

(51) Int. Cl.

| | |
|---|---|
| ***B01F 25/21*** | (2022.01) |
| ***B01F 25/54*** | (2022.01) |
| ***B01F 27/25*** | (2022.01) |
| *B01F 101/00* | (2022.01) |

(52) U.S. Cl.

CPC ...... *B01F 25/2123* (2022.01); *B01F 25/2121* (2022.01); *B01F 25/2122* (2022.01); *B01F 25/54* (2022.01); *B01F 27/251* (2022.01); *B01F 2101/005* (2022.01)

(58) Field of Classification Search

CPC .............. B01F 25/2123; B01F 25/2121; B01F 25/2122; B01F 25/54; B01F 27/25; B01F 27/251; B01F 2101/005

See application file for complete search history.

(56) References Cited

U.S. PATENT DOCUMENTS

| | | | | |
|---|---|---|---|---|
| 3,537,659 A * | 11/1970 | Vagedes | B01F 27/8111 | 241/97 |
| 4,594,006 A * | 6/1986 | Depeault | A01C 3/026 | 417/900 |
| 5,282,681 A * | 2/1994 | Supelak | B01F 33/502 | 366/244 |
| 6,964,511 B2 * | 11/2005 | Rumph | B01F 27/073 | 366/345 |
| 2012/0224982 A1 * | 9/2012 | Nuhn | F04D 29/466 | 417/430 |
| 2017/0118907 A1 * | 5/2017 | Nuhn | B01F 25/21 | |

FOREIGN PATENT DOCUMENTS

| | | | |
|---|---|---|---|
| DE | 2817301 A1 * | 10/1979 | |
| FR | 2381560 A1 * | 2/1977 | |
| GB | 2058598 A * | 4/1981 | B65G 53/30 |

* cited by examiner

*Primary Examiner* — Marc C Howell
(74) *Attorney, Agent, or Firm* — Merchant & Gould P.C.

(57) ABSTRACT

An example fluid moving device for manure agitation in a pit located beneath a confinement building can include: a boom extending vertically into a pump-out wall of the pit; and a mechanism for extending horizontally into a main chamber of the pit to provide agitation. In some examples, the device can also include a self-propelled mechanism for moving along a surface.

19 Claims, 23 Drawing Sheets

LIQUID MANURE AGITATION

RELATED APPLICATION(S)

This application is related to U.S. Patent Application No. 63/480,064 filed on Jan. 16, 2023, the entirety of which is hereby incorporated by reference.

BACKGROUND

Livestock confinement buildings store the liquid manure underneath the building, below ground level. Over the course of a year, the solid materials in that waste settle to the bottom and can sometimes turn into thicker sludge. Before pumping the manure out of the building into the field to be used as fertilizer, the manure must be mixed or agitated such that all the solids at the bottom become suspended in a homogeneous way. If the manure is not mixed well, the manure used as fertilizer may provide inconsistent nutrients throughout the field depending upon from which stage of the pumping process it came; such as solid and nutrient rich in the bottom, more water and less nutrient rich on top.

Another issue with improper agitation is the amount of remaining solids in the middle and bottom of the building when the liquid has all been pumped out. This creates mounds that get harder over time and are less likely to be removed in subsequent years with existing agitation methods. The mounds decrease the pit's holding capacity, meaning it must be pumped out more often, which is expensive and time consuming. Most often, solids settle towards the middle of the building, along the edges and in the corners, which are difficult to stir up with typical pit pumps used in the industry today.

SUMMARY

In one aspect, an example fluid moving device for manure agitation in a pit located beneath a confinement building can include: a boom extending vertically into a pump-out wall of the pit; and a mechanism for extending horizontally into a main chamber of the pit to provide agitation.

In another aspect, an example method for manure agitation in a pit located beneath a confinement building can include: extending a pump vertically into a pump-out wall of the pit; and extending a mechanism horizontally into a main chamber of the pit to provide agitation.

DETAILED DESCRIPTION

Figure 1:
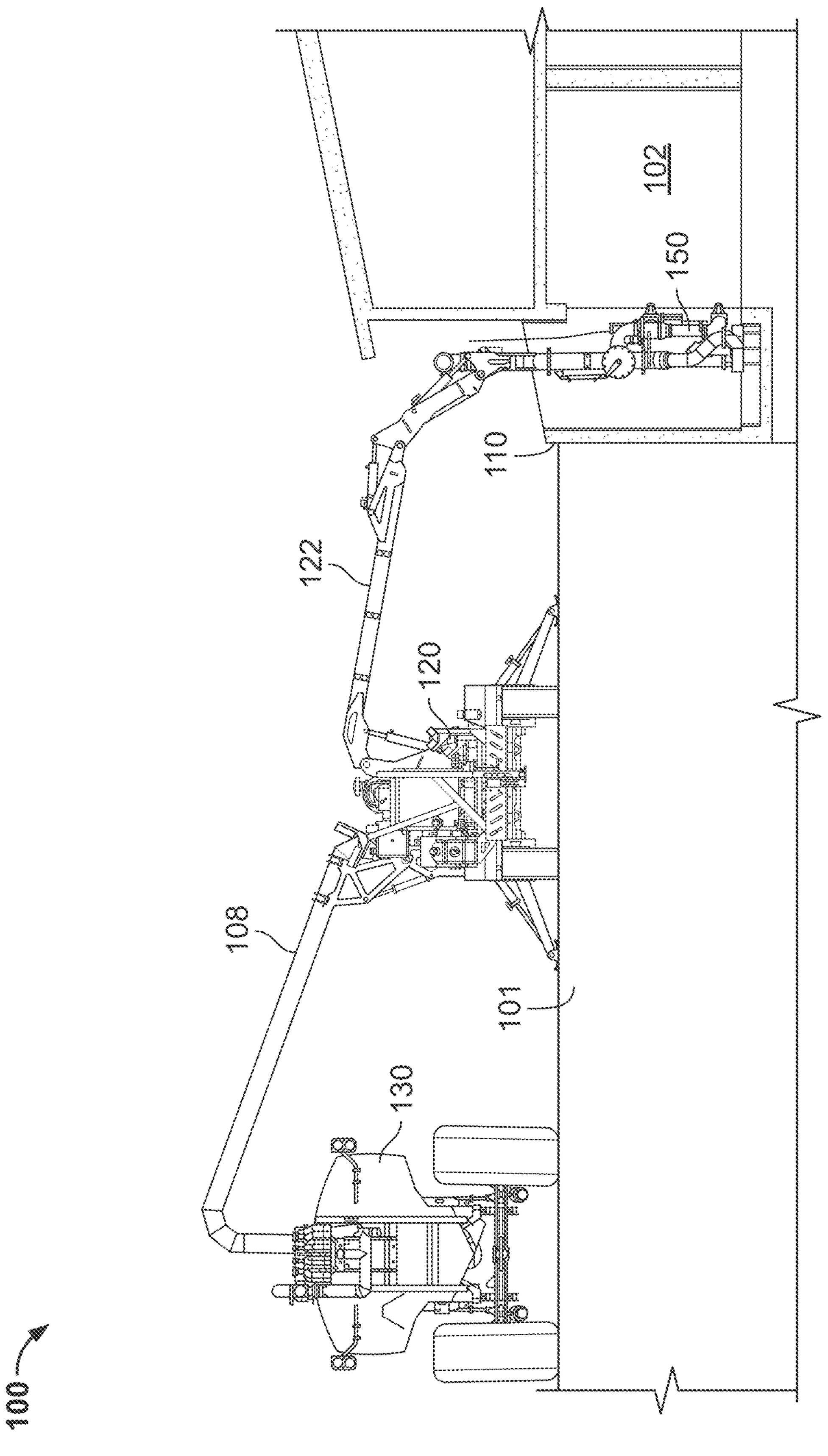
FIG. 1 shows an example environment with a device including an agitation boom with a pump and multiple agitation nozzles configured to fill a manure tanker.
Figure 2:
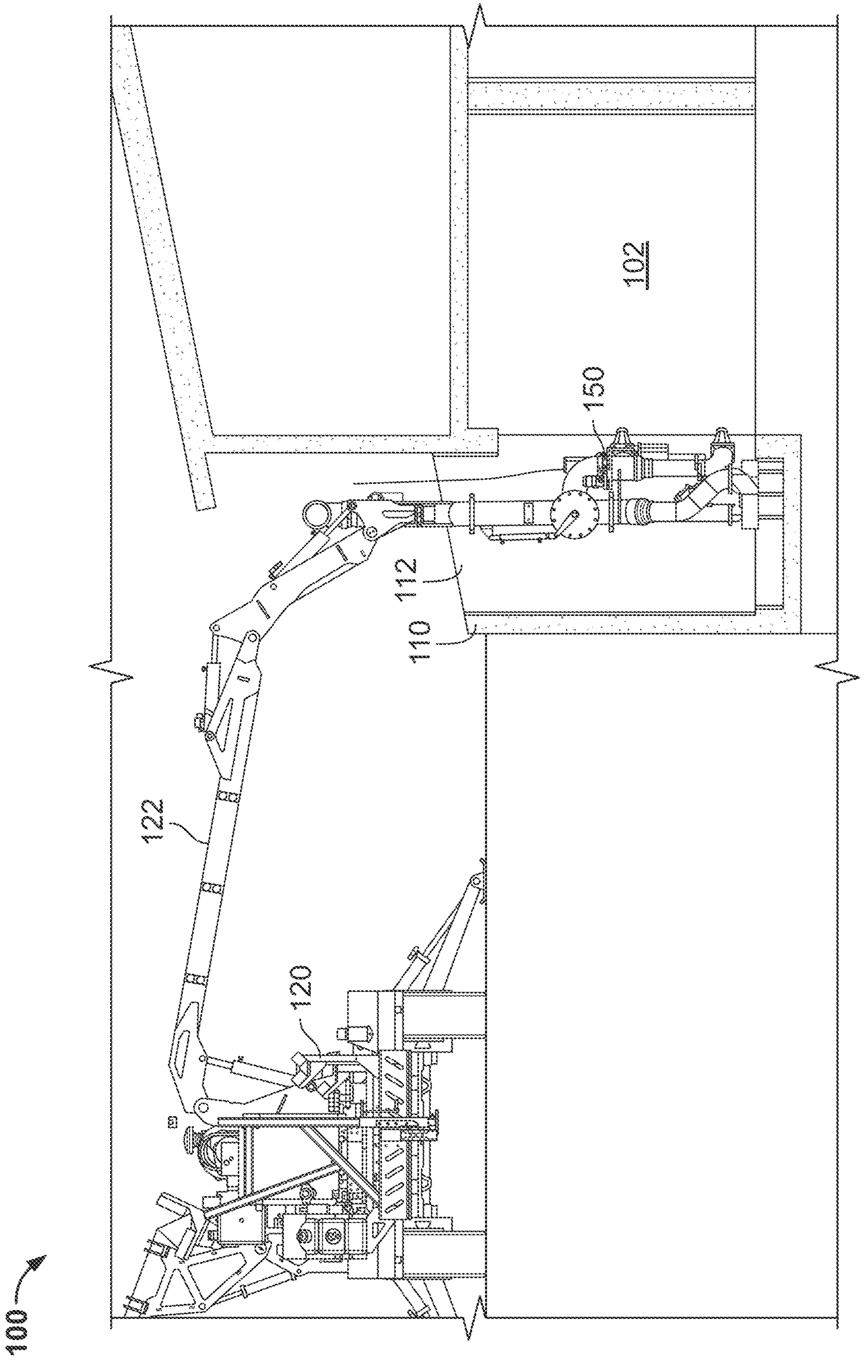
FIG. 2 shows the pump of FIG. 1 in a pit opening positioned for pumping and agitation.
Figure 3:
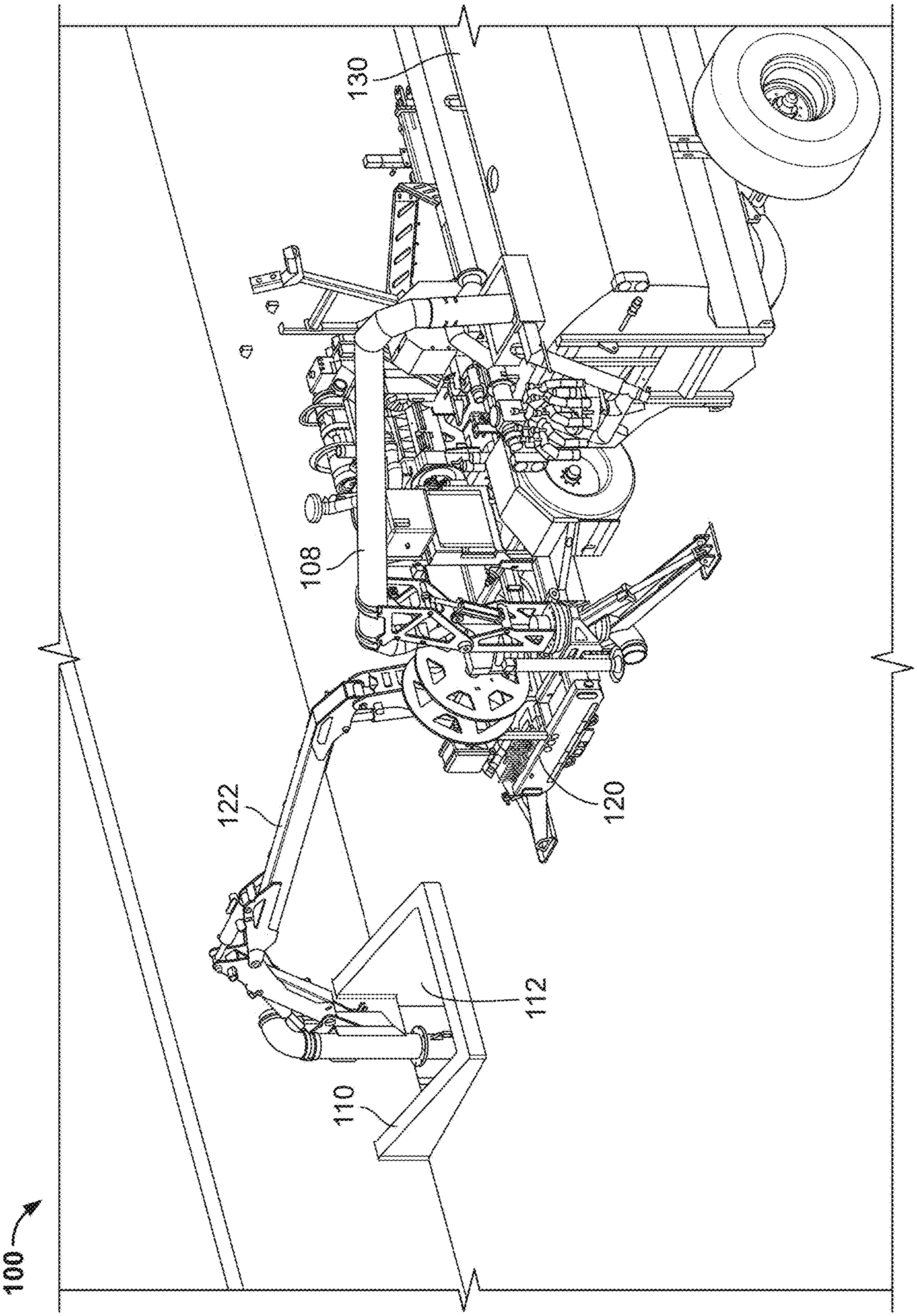
FIG. 3 shows another view of the device including the agitation boom of FIG. 2.
Figure 4:
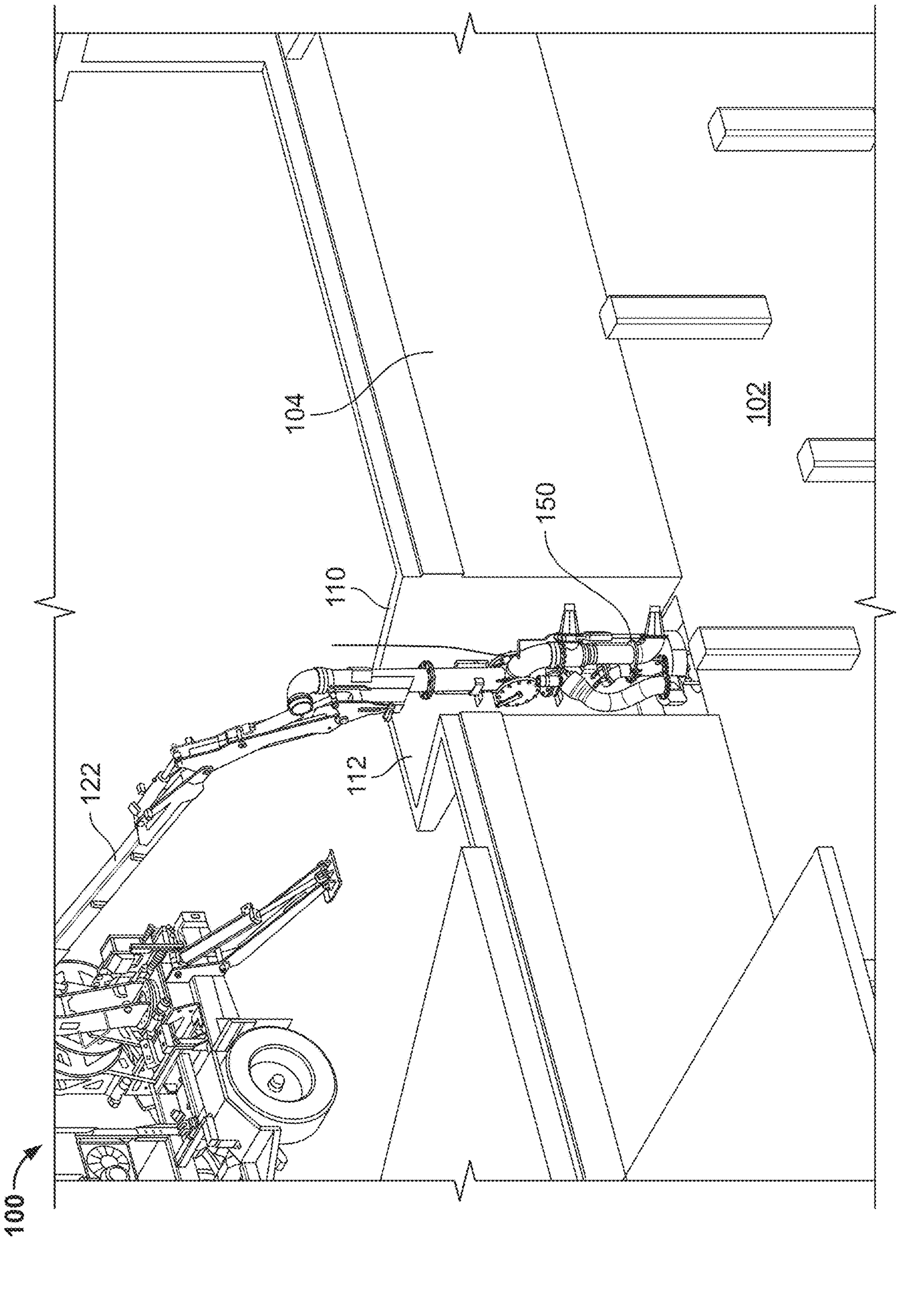
FIG. 4 shows yet another view of the device including the agitation boom of FIG. 2.
Figure 5:
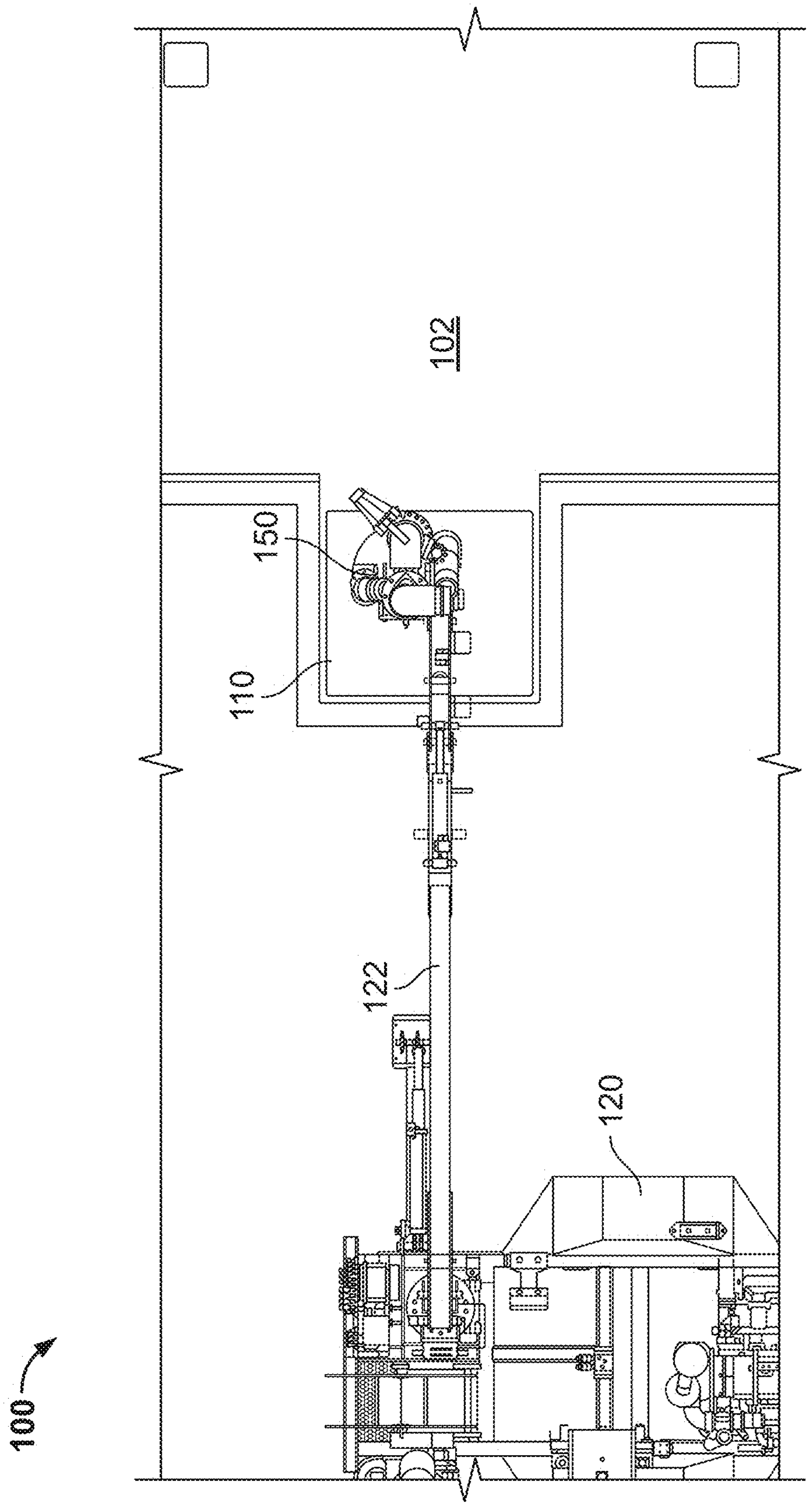
FIG. 5 shows the agitation boom of FIG. 2 with the agitation nozzles configured to agitate into a building at an angle.
Figure 6:
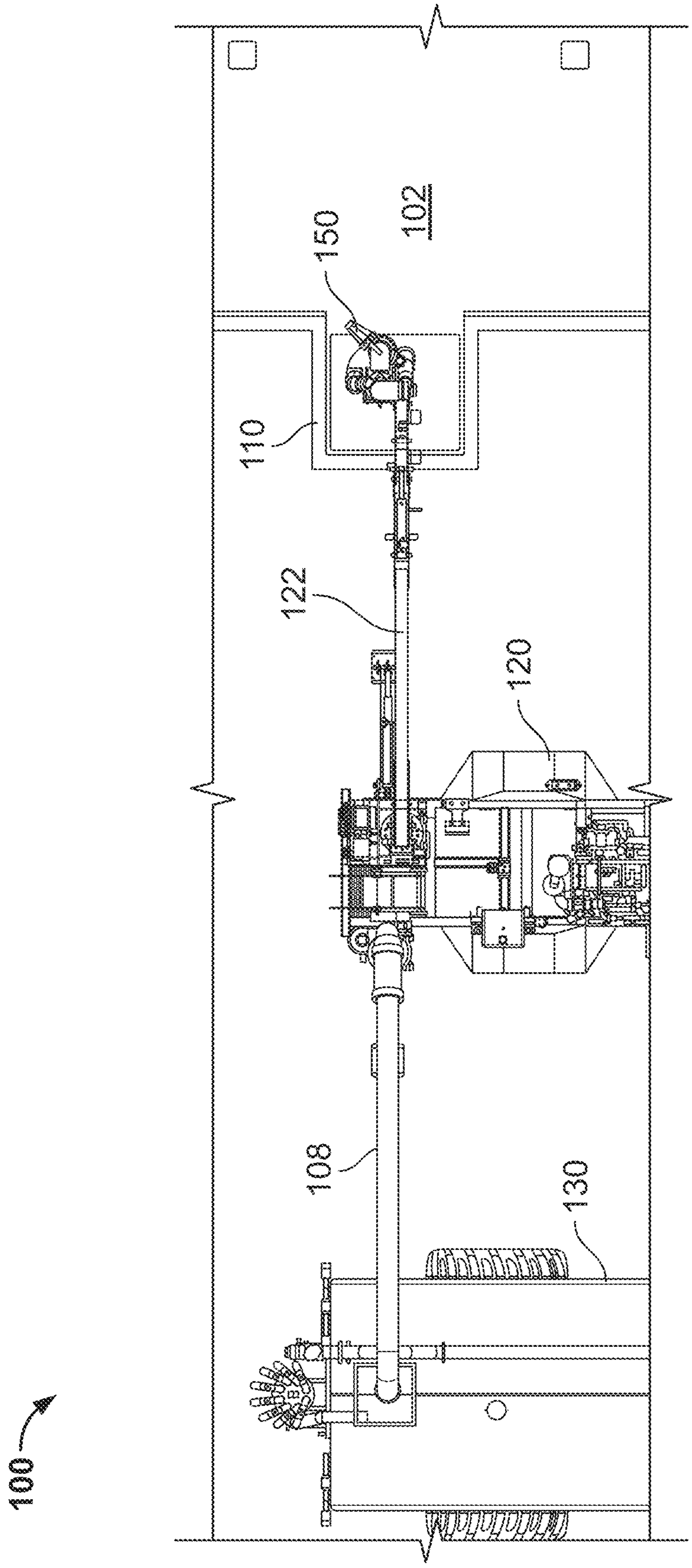
FIG. 6 shows another view of the agitation boom of FIG. 5.
Figure 7:
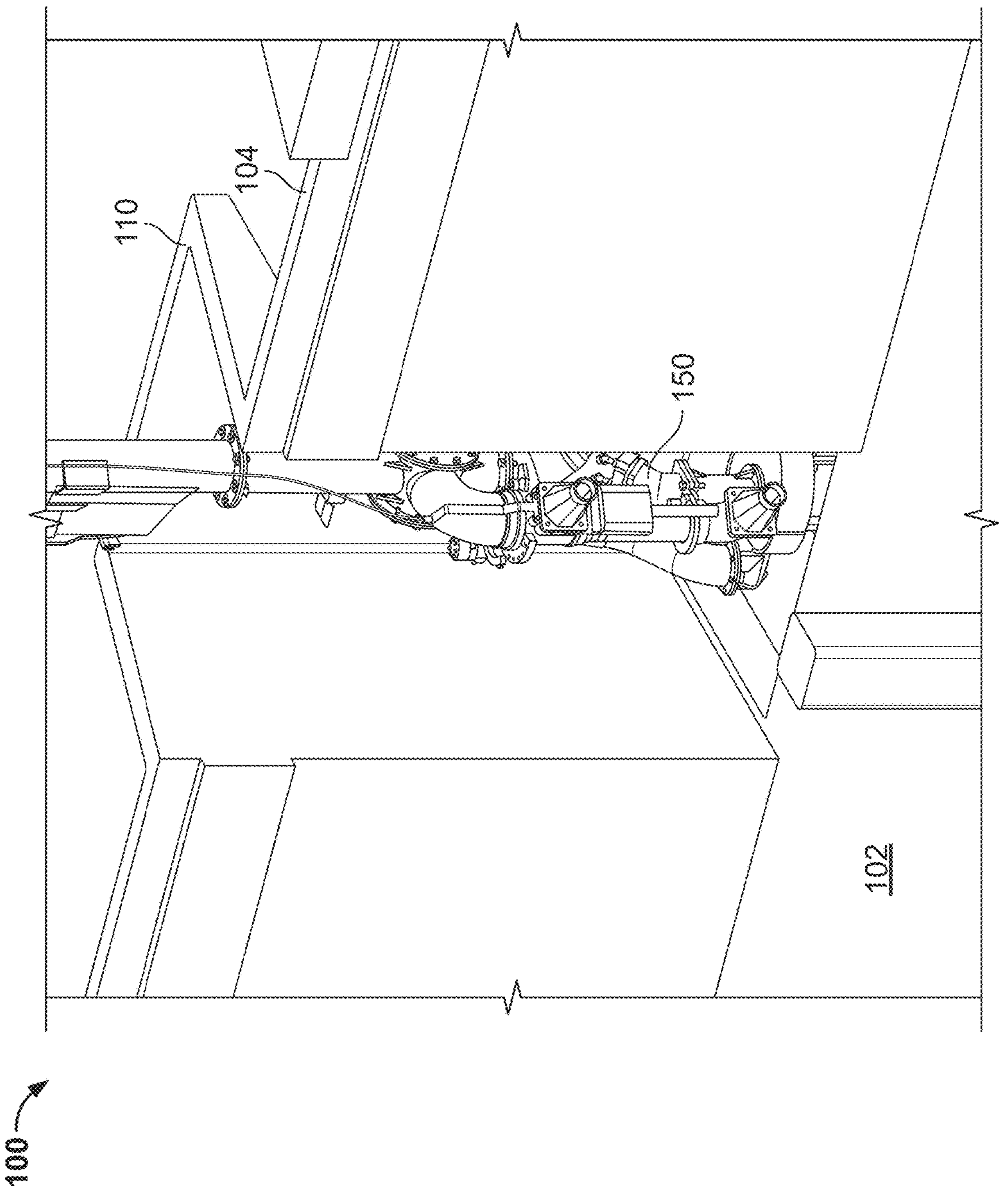
FIG. 7 shows a view of the agitation boom of FIG. 5.
Figure 8:
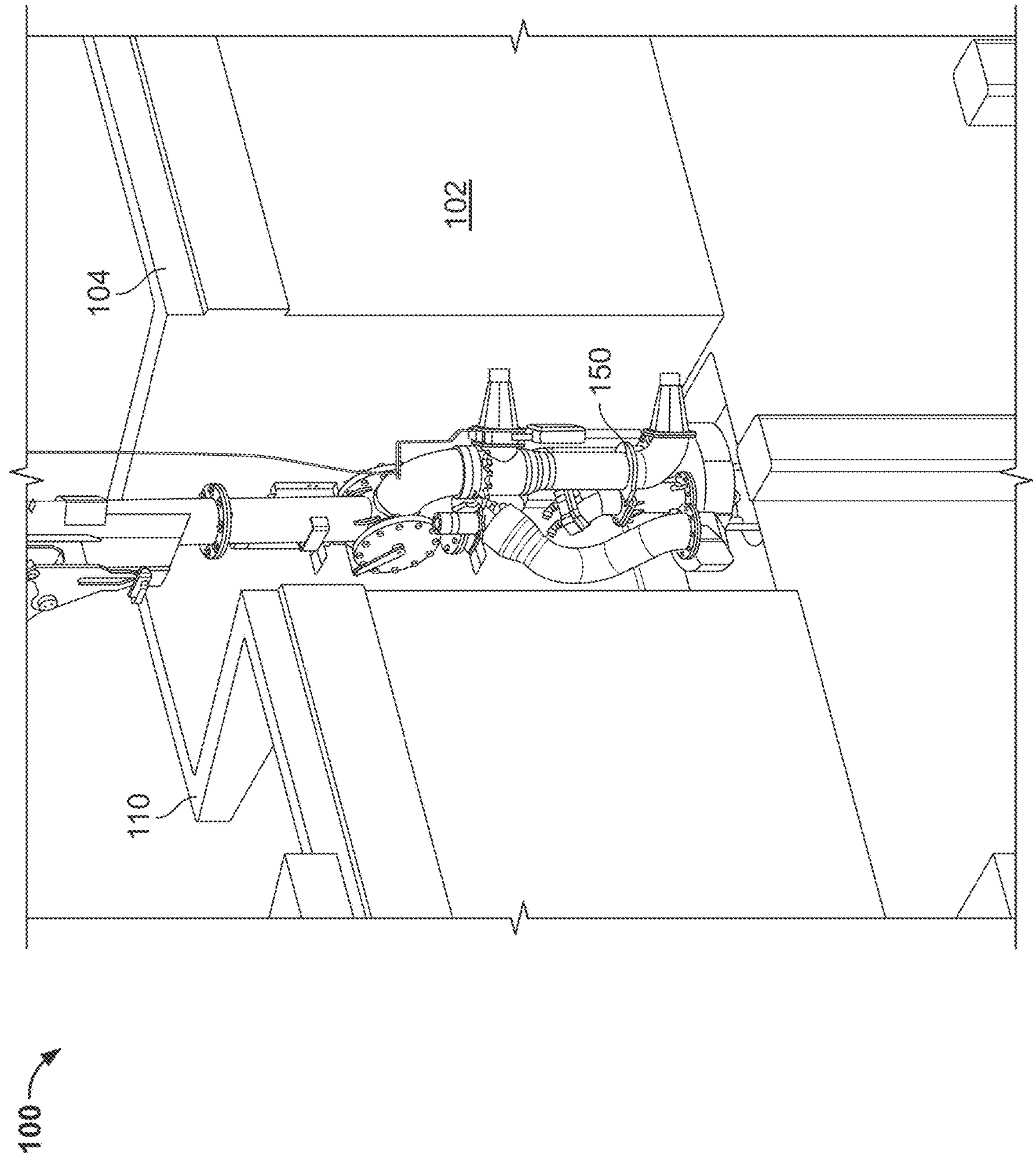
FIG. 8 shows another view of the agitation boom of FIG. 5.
Figure 9:
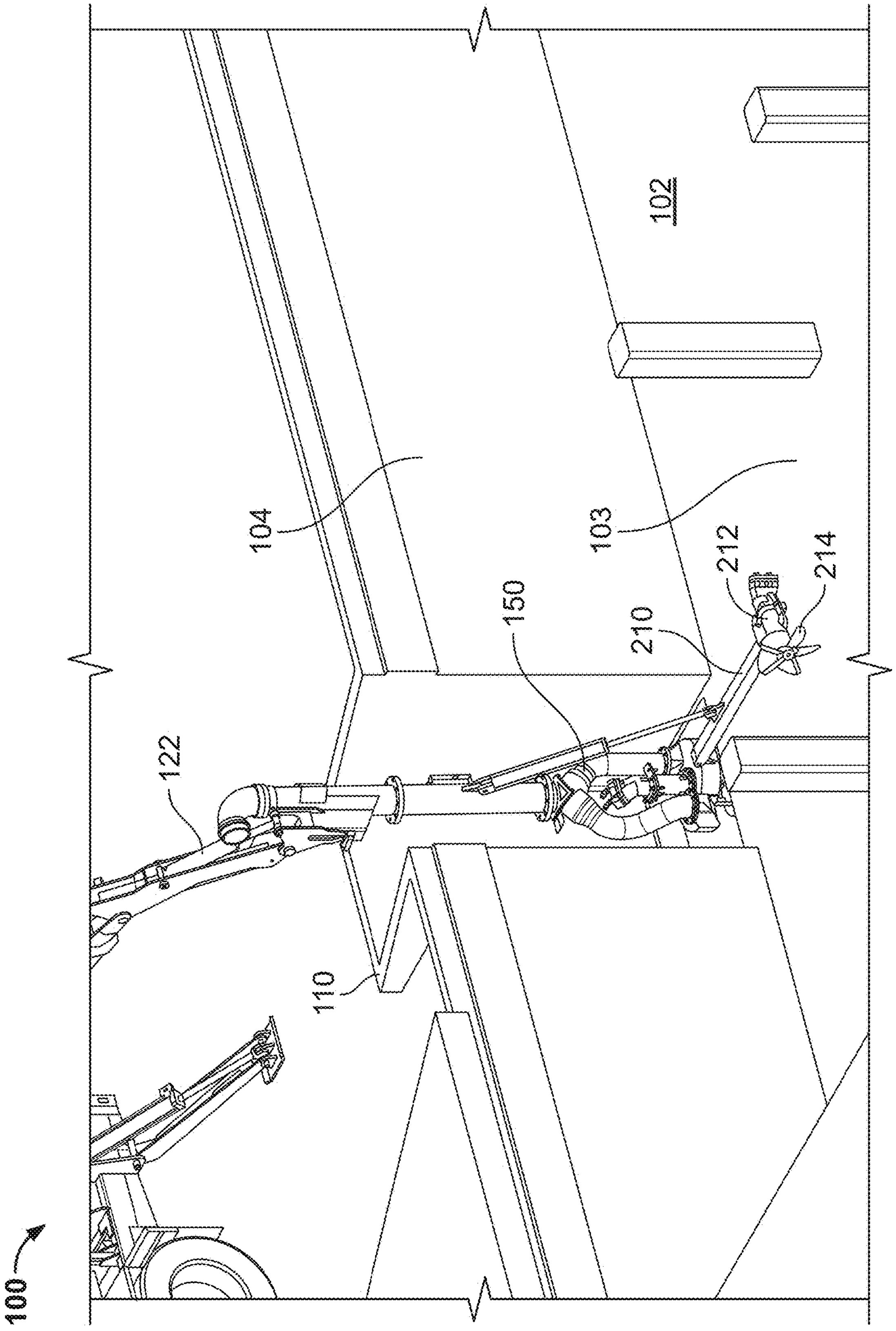
FIG. 9 shows another example environment with a device including an agitation boom with a structure mechanism including an agitator.
Figure 10:
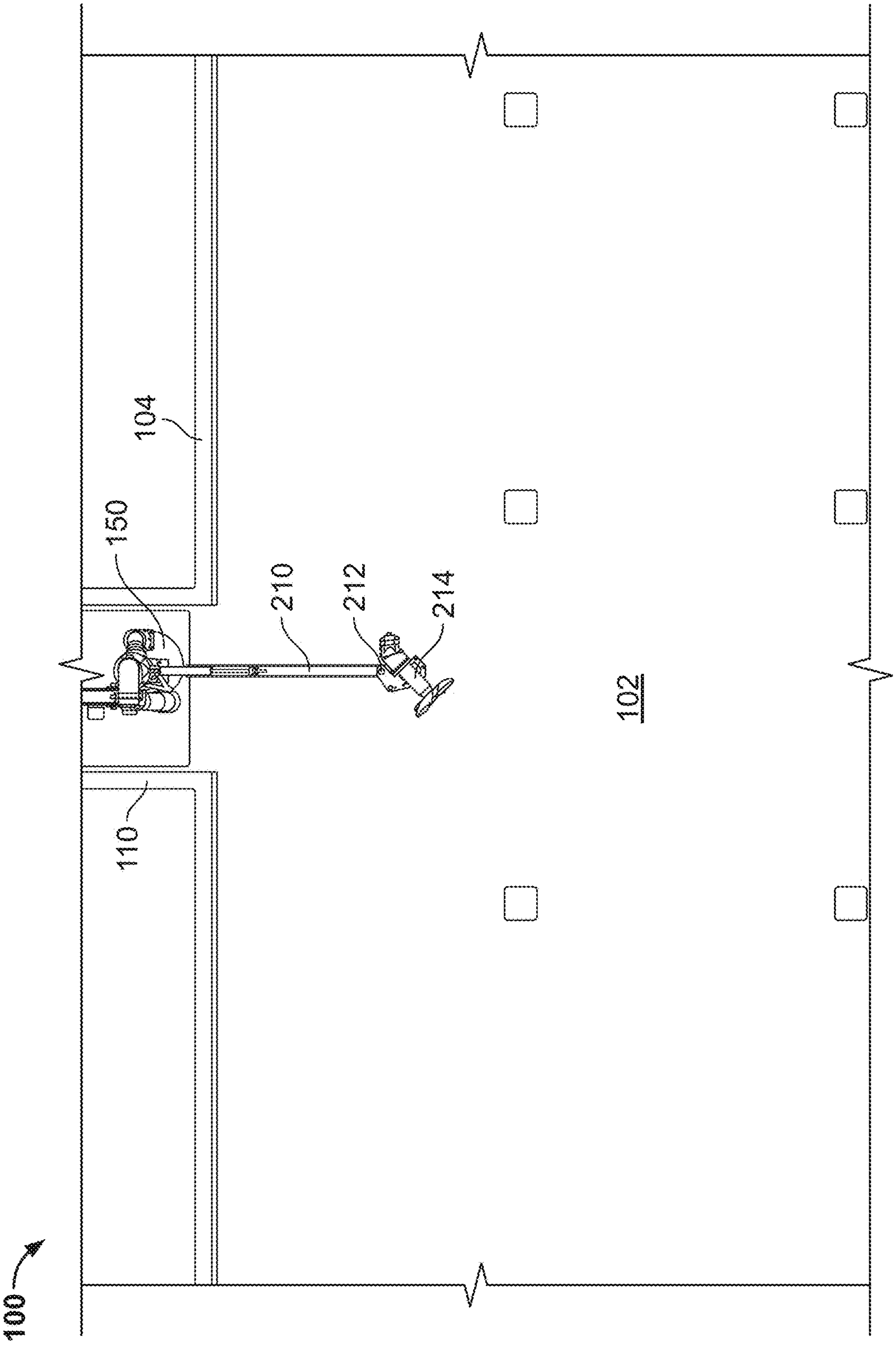
FIG. 10 shows another view of the agitation boom of FIG. 9.
Figure 11:
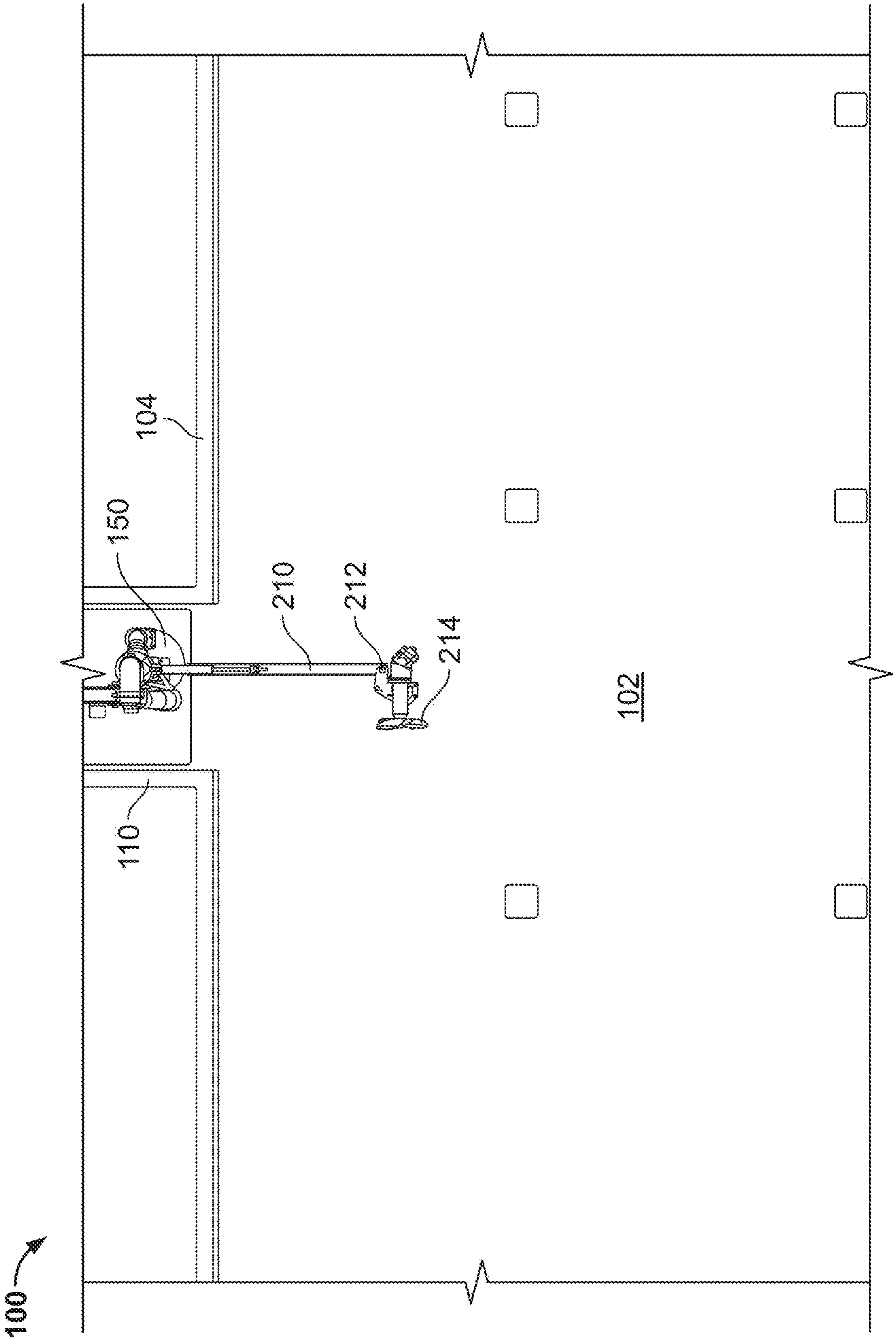
FIG. 11 shows yet another view of the agitation boom of FIG. 9.
Figure 12:
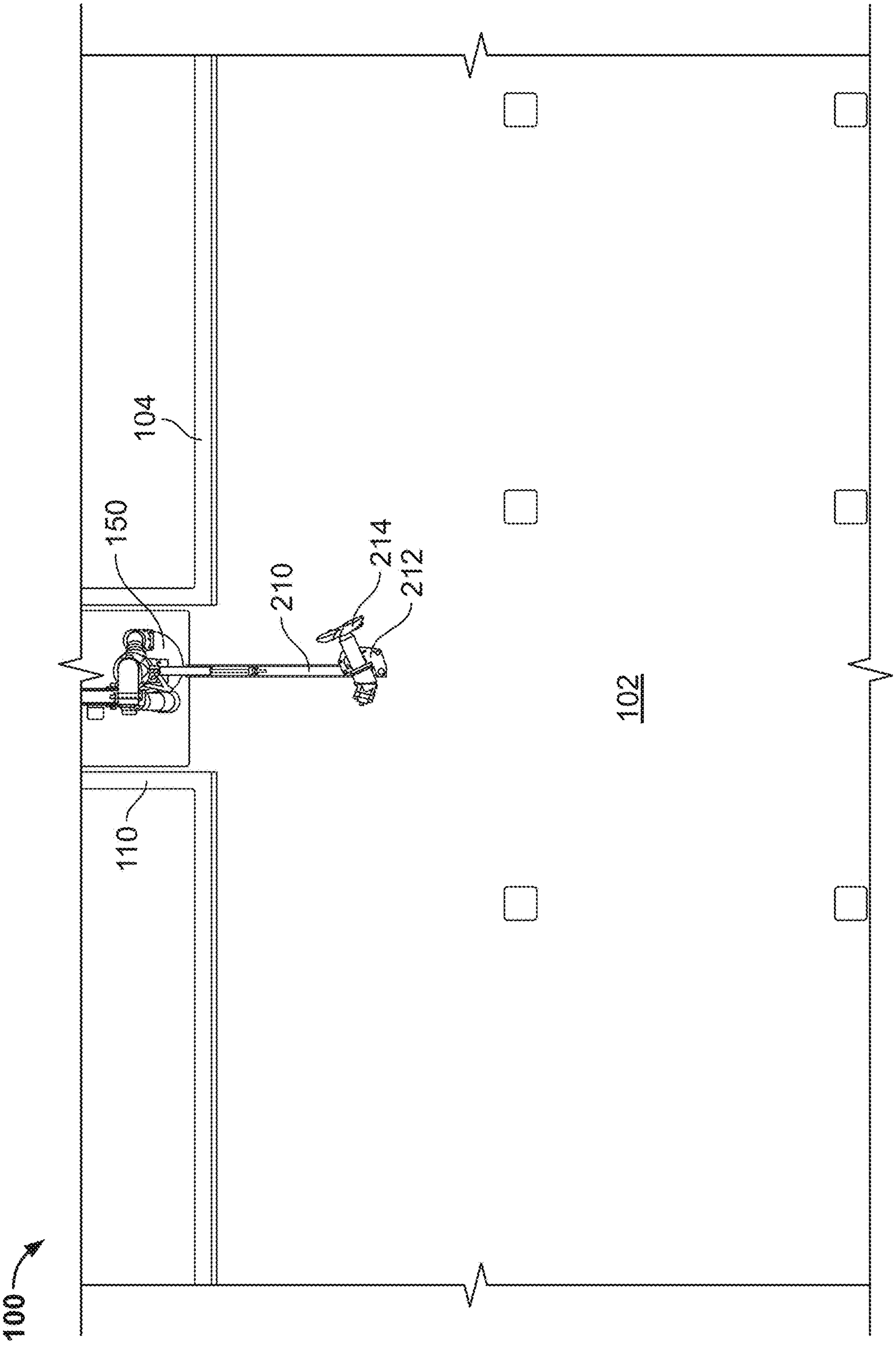
FIG. 12 shows yet another view of the agitation boom of FIG. 9.
Figure 13:
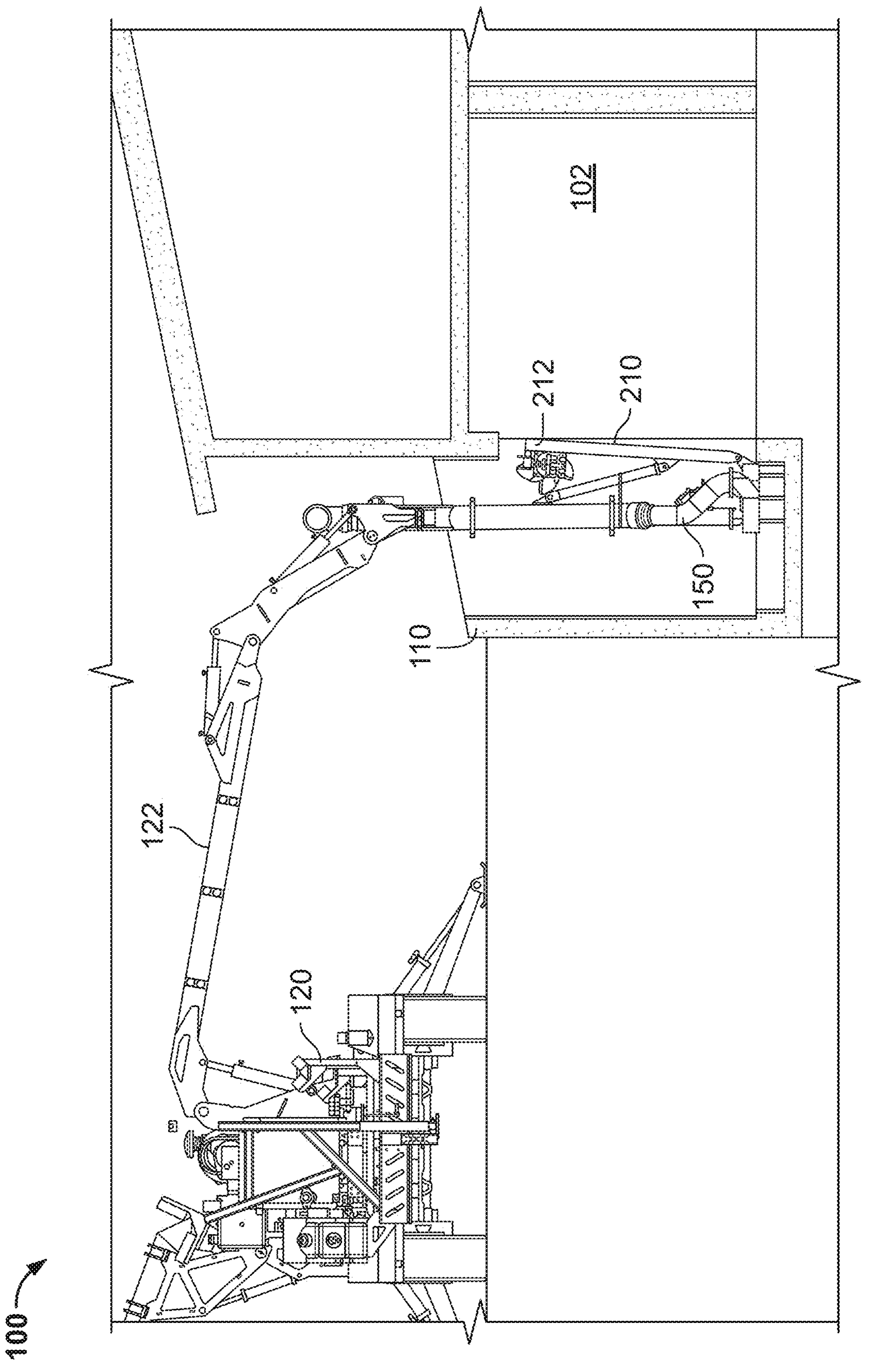
FIG. 13 shows another view of the agitation boom of FIG. 9 with the pivoting structure mechanism in a retracted position.
Figure 14:
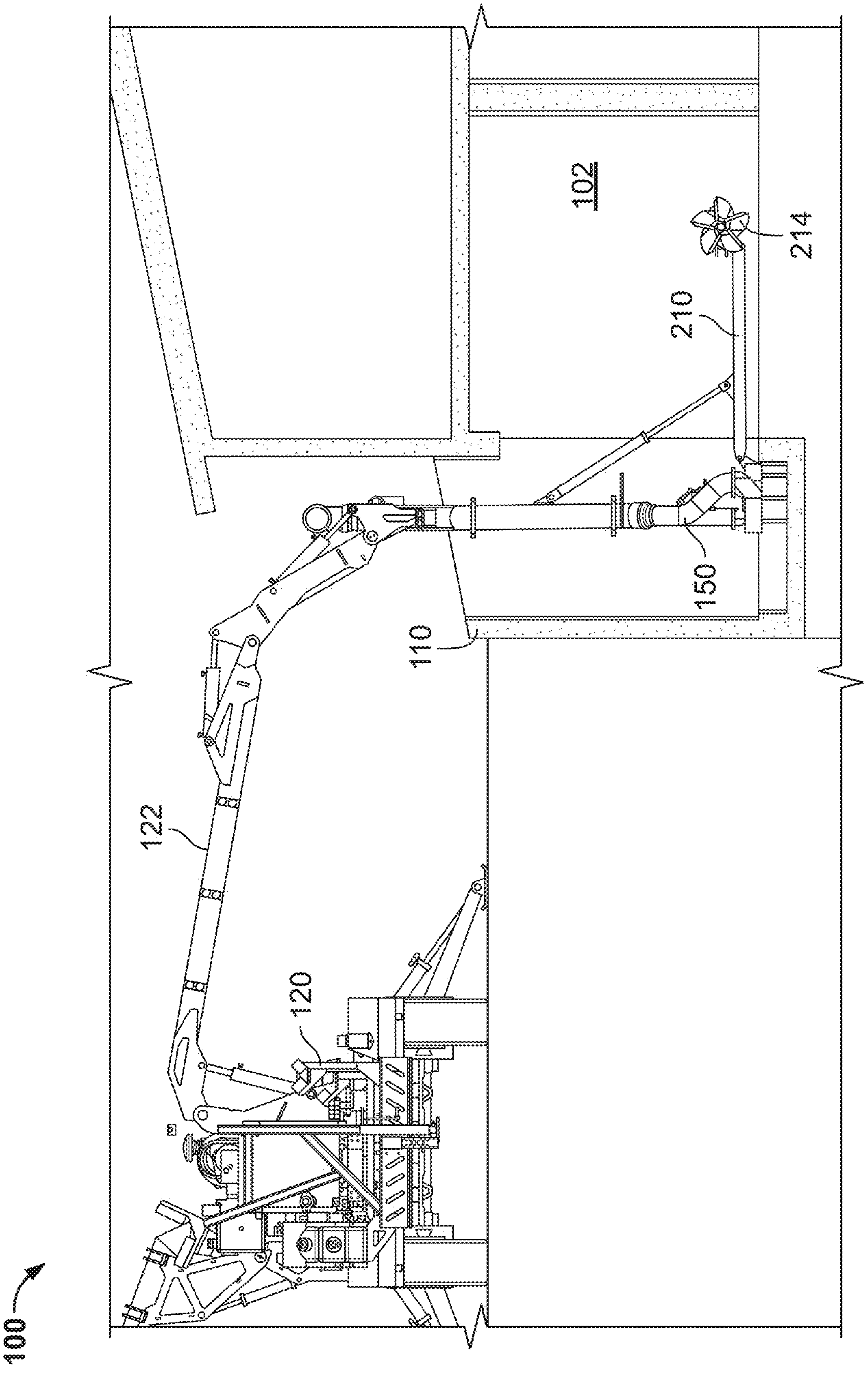
FIG. 14 shows a view of the agitation boom of FIG. 13 with the pivoting structure mechanism in an extended position.
Figure 15:
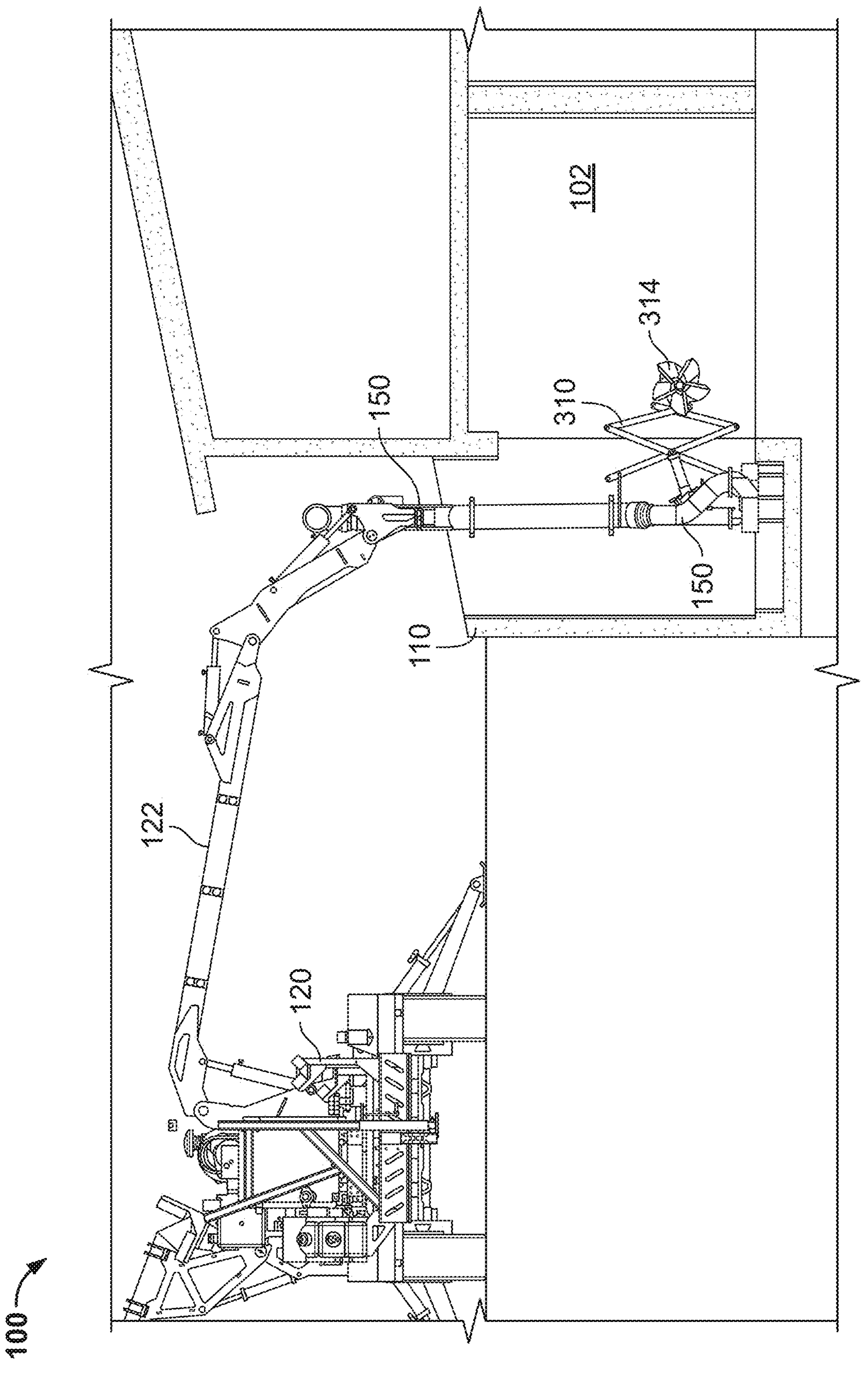
FIG. 15 shows another example structure mechanism with a scissor extender in a semi-extended position.
Figure 16:
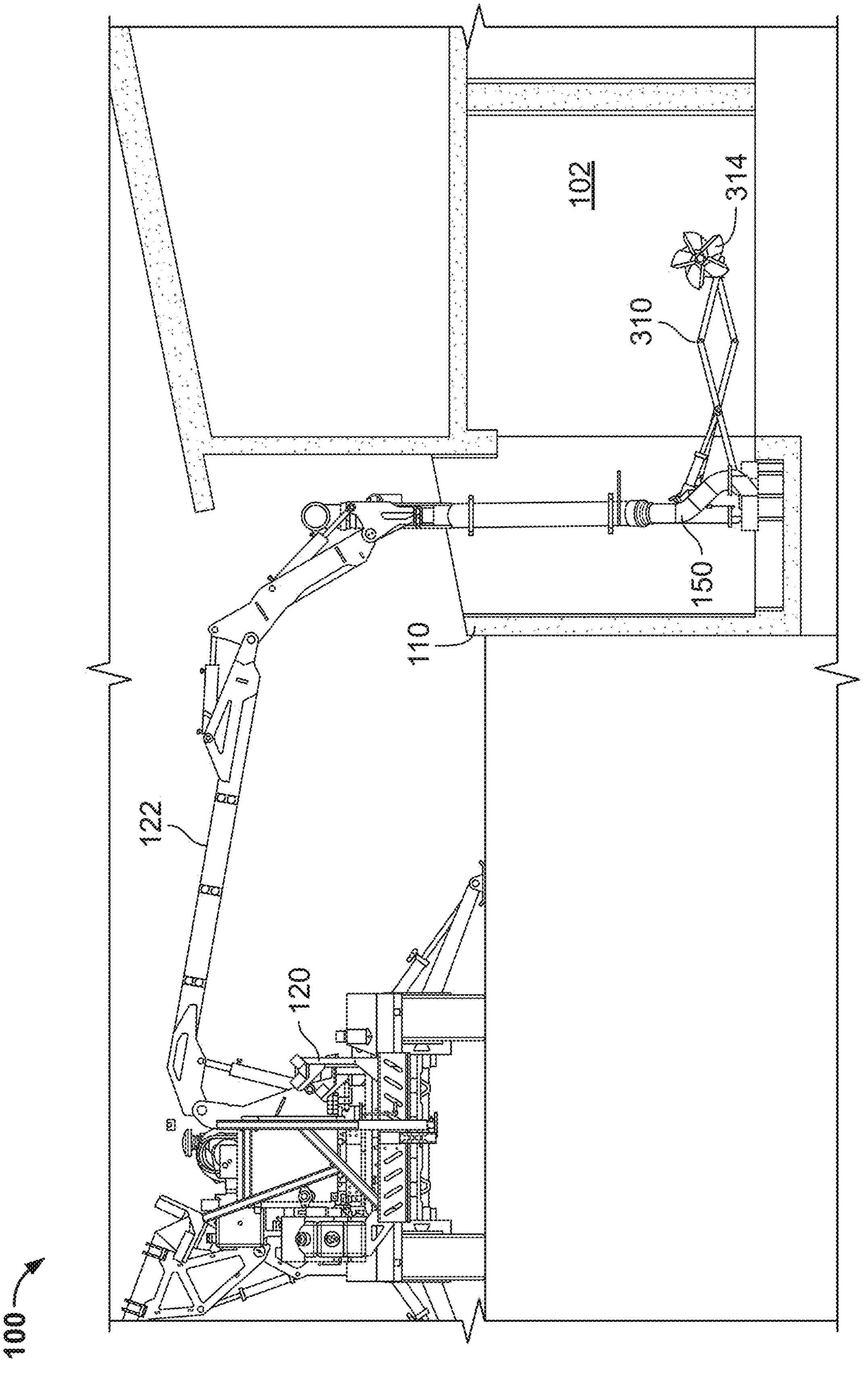
FIG. 16 shows the structure mechanism of FIG. 15 with the scissor extender in an extended position.
Figure 17:
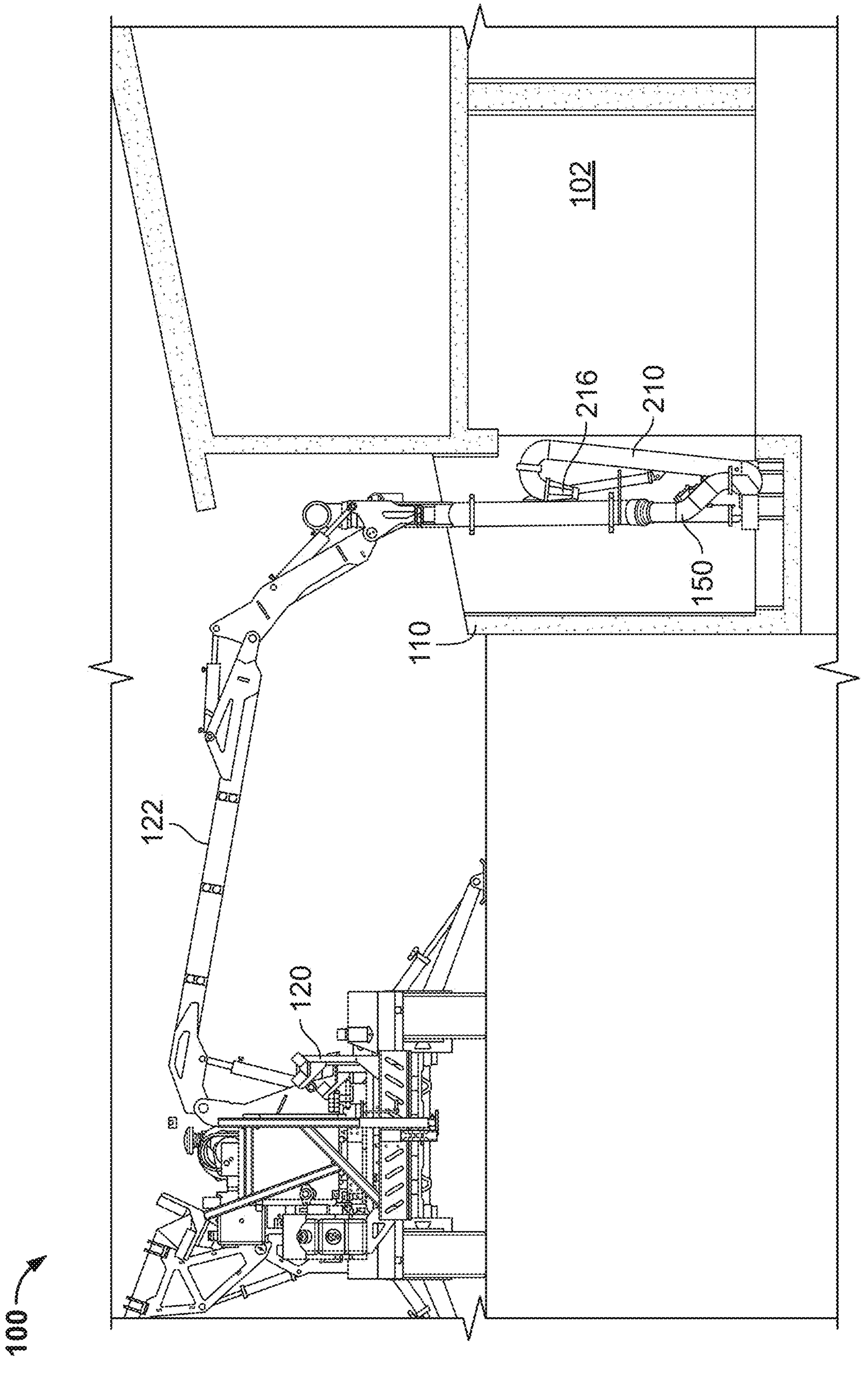
FIG. 17 shows another example structure mechanism with a pump nozzle in a retracted position.
Figure 18:
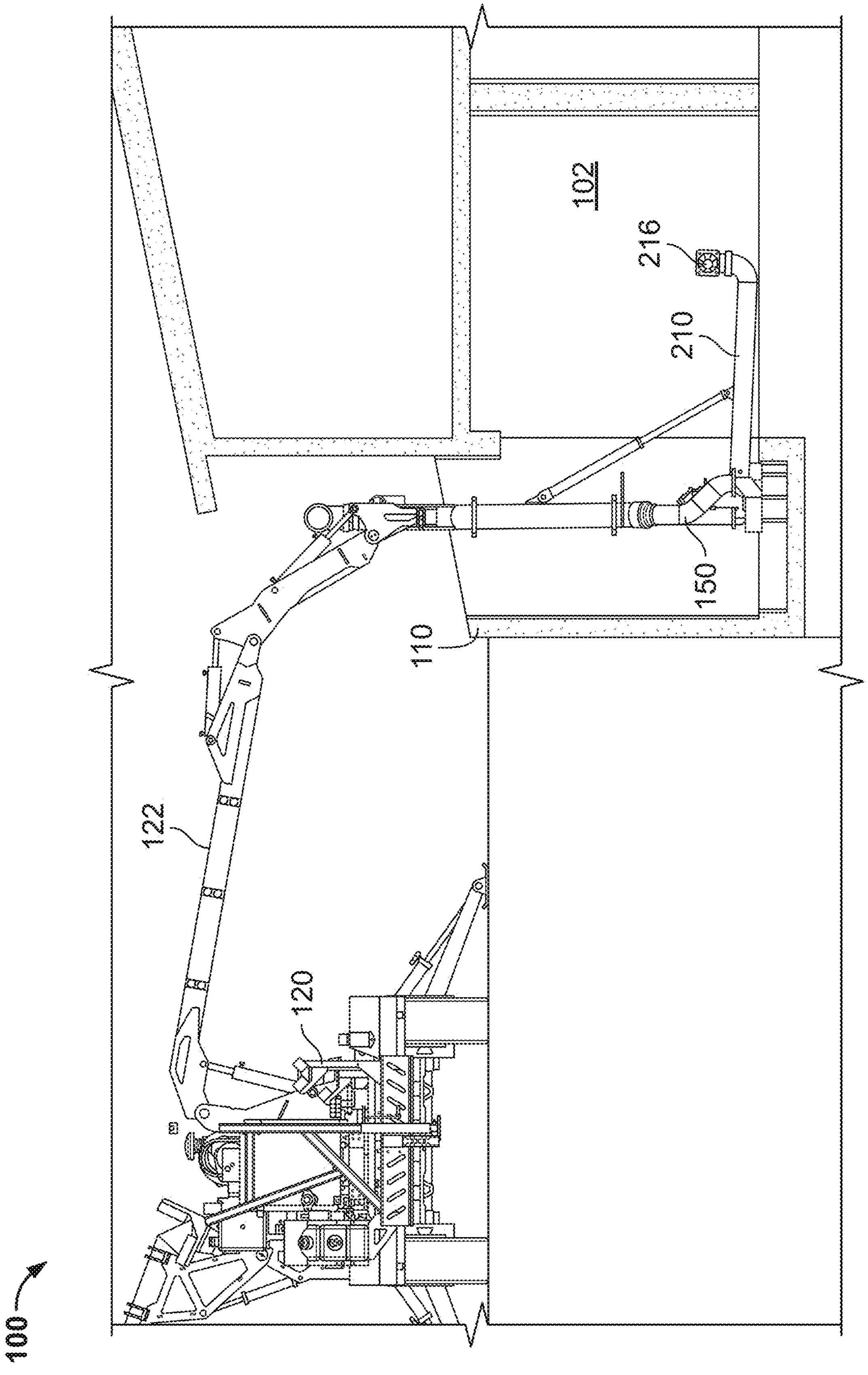
FIG. 18 shows the structure mechanism of FIG. 17 with the pump nozzle in an extended position parallel to side walls of the structure.
Figure 19:
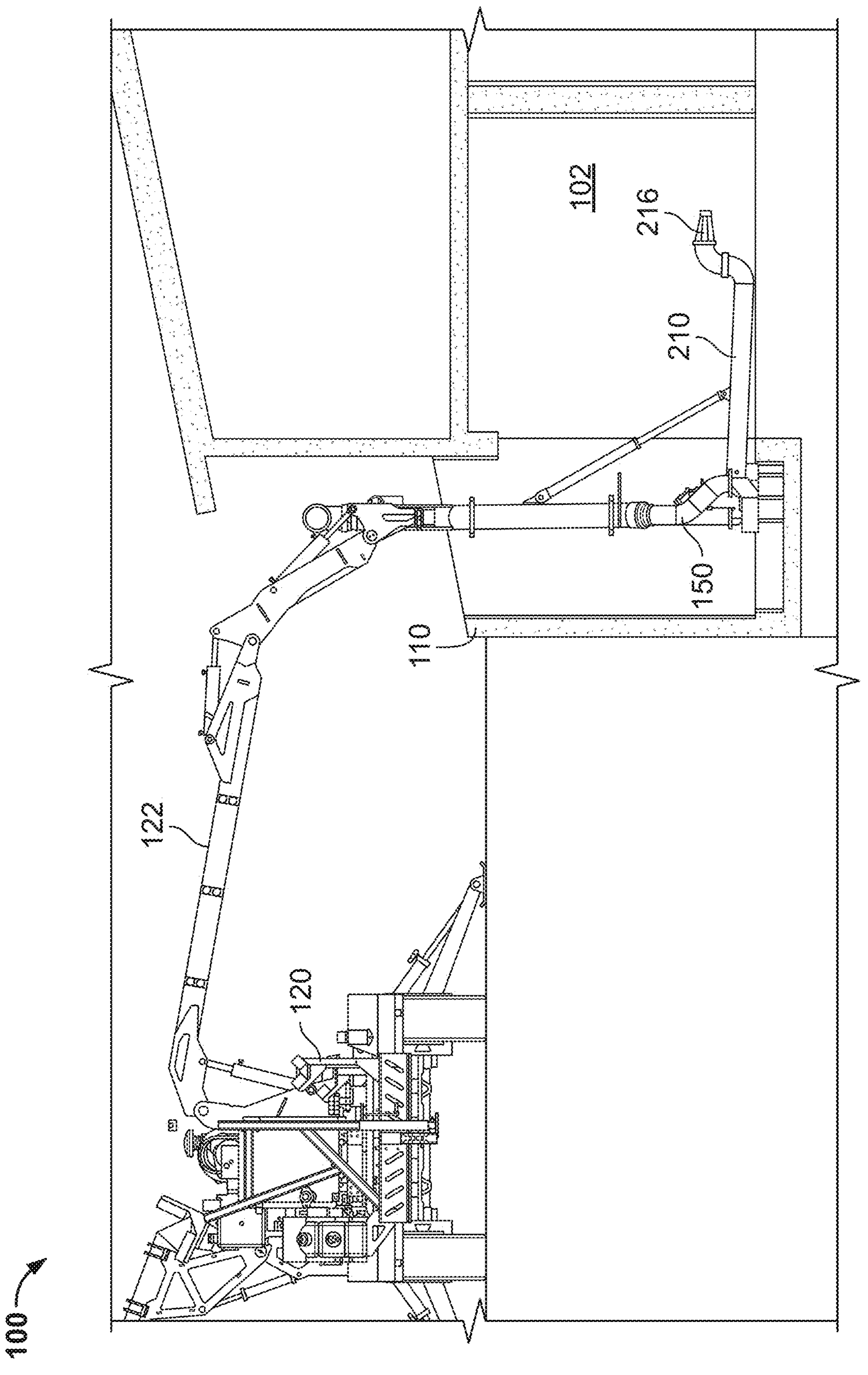
FIG. 19 shows another view of the structure mechanism of FIG. 18 with the pump nozzle in the extended position pointing towards a center of the structure.
Figure 20:
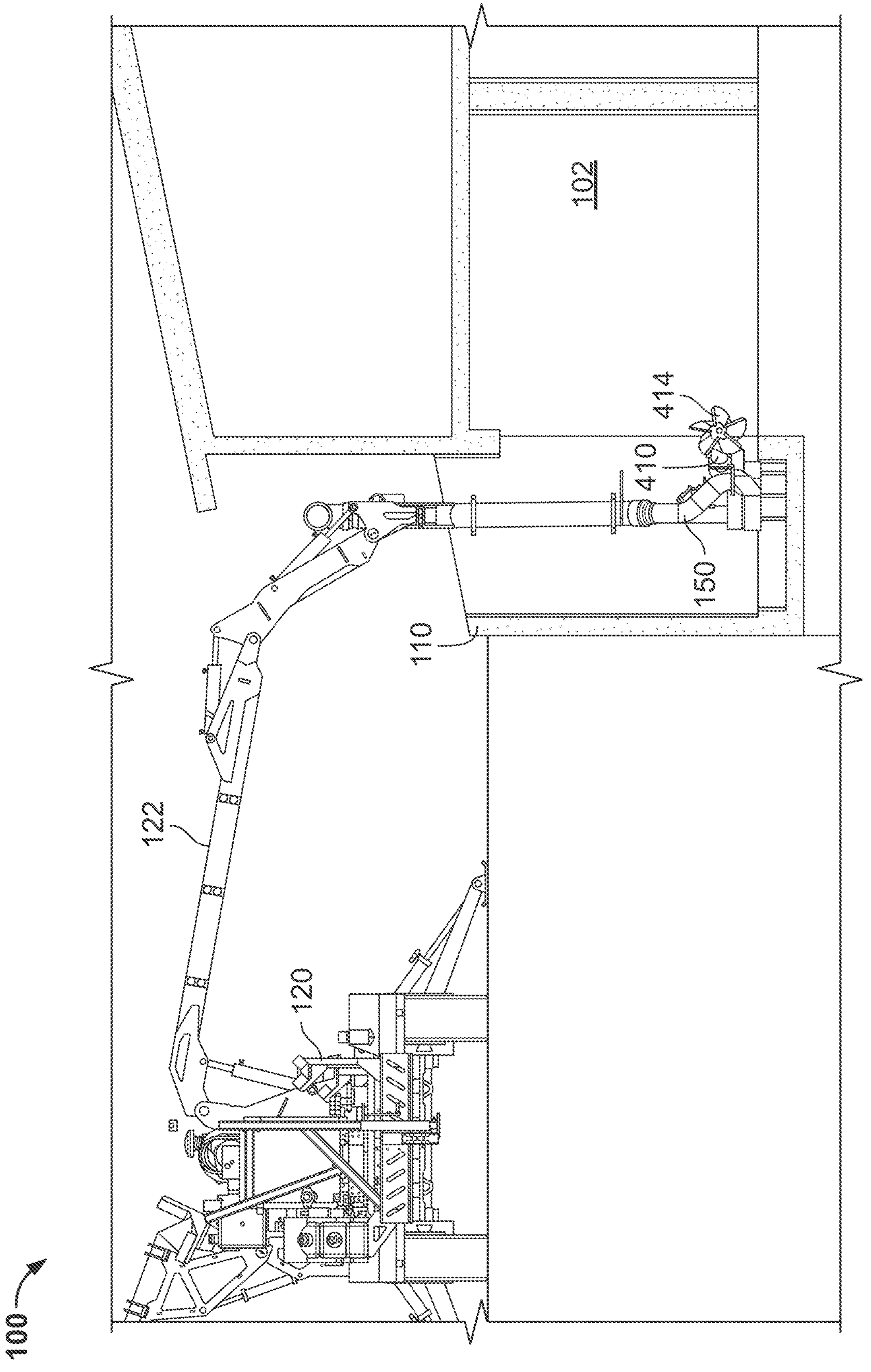
FIG. 20 shows another example structure mechanism with a telescoping extender in a retracted position.
Figure 21:
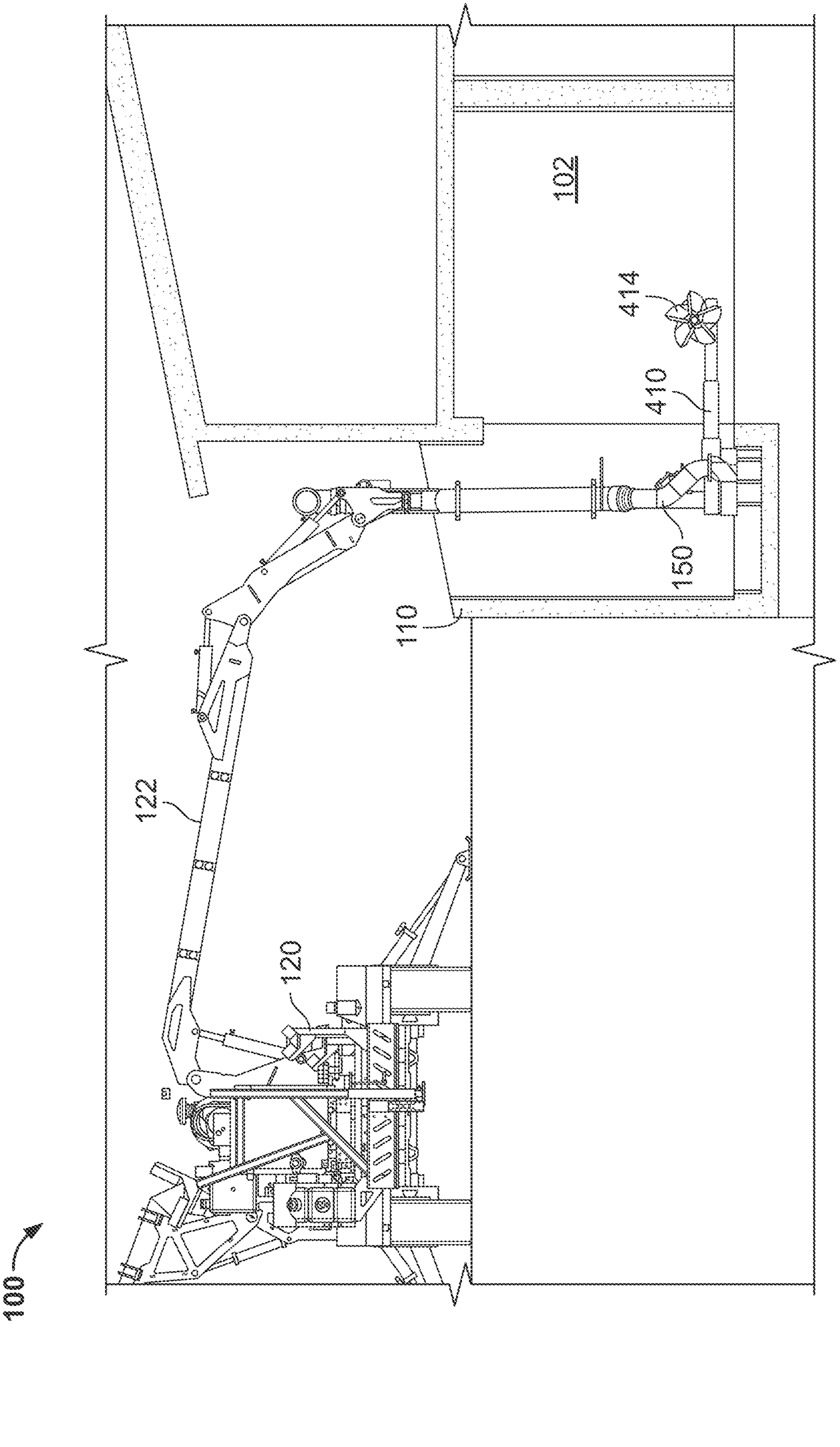
FIG. 21 shows another view of the structure mechanism of FIG. 20 with the telescoping extender in an extended position.

Agitation and pumping out manure are not only done in deep-pit confinement buildings, but also in open pit lagoons. Some of the solutions described herein can be used in either scenario.

As shown in FIG. 1-8, the main access points to the pits 102 are along the sides, and typically a rectangular build-out 110 (commonly referred to as a "pump-out") which extend beyond the side walls 104 of the building so the top of the pit can be accessed from outside of the building. Several problems can arise with this, one being the ease of access to the pump-outs 110 because there may not be ground 101 that is easily drivable with a truck/trailer 120 and it creates a size constraint and engineering challenge to drop something of minimal size into the build out. Tractors have an easier time on less stable ground but can be expensive and not efficiently driven from pump site to pump site.

Once the equipment is submerged in that pump-out location, then agitating far enough underneath the main area of the building becomes a challenge. Existing agitation methods may use pickups and trailer units to navigate to the site, or a tractor and tractor mounted pump. Also, they do not extend out into the main pit area to agitate parallel with side walls or far enough into the center of the building to adequately lift solids.

Other issues solved by this device 120 are the need for hauling a long pipe (load stand) 108 for transferring liquid from the pit into the manure tanks 130. This device 120 includes an adjustable load pipe 108 built onto the trailer for transferring liquids up and into the top access port of the tanks 130. The sequence is as follows: The tanks 130 are pulled with tractors onto the manure sites, stop their inlet port below the load stand 108, turn on the pumping device 120 to fill the tank 130, and then drive to the field to apply the manure as fertilizer. Other types of tanks include semi-trucks pulling manure filled tanks, and tanker trucks, both of which can be used for transferring manure to a different site. Typically, the load stands 108 are a separate piece of equipment 40 or 50 feet long and must be pulled behind a truck or tractor to the job site. This is slow and dangerous because the load stands 108 are not designed to move quickly and the turning radius is large. These things are all inconveniences for operators who want to move from site to site as quickly and safely as possible.

Existing solutions for moving agitation equipment to the pump site is using truck/trailer 120 with extendable booms, tractor with mounted PTO pumps (Vertical pit pump). Each of these typically has a propeller, pump/nozzle, or a combination thereof to agitate the manure.

For agitation, existing solutions agitate manure using a propeller or a pump 150 with adjustable angle discharge nozzles dropped vertically into the pit 102 from the exterior pit pump out opening 112. These do not extend further into the pit 102 than the pump out area 110 because they are longer than the pit 102 is tall, so they protrude out above the pump out opening 112 and cannot extend laterally into the main chamber of the pit 102. See FIGS. 1-8.

In one typical method, the propeller or pump/nozzles 150 are typically attached to a hydraulic boom 122 that can be lowered into the pit 102 using a hydraulic control valve. In other embodiments, other mechanisms can be used to lower the propeller or pump/nozzles, such as telescoping or articulating booms, grappling arms, tipping, telescoping, sliding mechanisms, or any combination thereof.

In this instance, the agitation method is typically run by a hydraulic motor driving a manure pump or propeller. These are generally powered by an engine mounted on a trailer running the hydraulic pump for power.

In another typical method, a Power Take Off (PTO) drive shaft is connected to the pump or propeller when it is fully submerged in the pump out, which is then connected to a tractor for power. Typically, these are mounted to the tractor via a pin hitch if it is a trailer style device, or if the weight of the device is carried entirely by the tractor it uses a 3-point or 2-point mount to stay engaged with the tractor.

Some buildings have submerged plumbing installed during initial construction to create flow patterns in different areas of the pit. These generally require a submersible pump method to create flow and pressure in the piping. Many have gate valving to open and close outlets to different areas. These gate valve succumb to corrosion over time and seize to a point they are unable to open or close. Since the plumbing systems only get used once or twice per year prior to the pit being pumped out, the plumbing can fill in with settled solids or the outlets get buried in enough solids that there's not enough pressure in the system to unplug. Problems inherent to built-in and submerged plumbing systems have yet to be solved in a way that makes them viable over the building's life.

Aspects of the present disclosure can include fluid moving devices with a means of extending fluid moving devices or fluid outlets beyond the pump-out wall and into the main chamber of the manure pit. See FIGS. 9-21. These fluid moving devices, as referred to herein, could be fluid outlets or nozzles from a fluid pump, propeller(s), ducted fans, Kort nozzles, eductor nozzles, or any other means for moving fluid, or a combination of these. Fluid outlets or pumps could be mounted directly to a pump or connected to a pump elsewhere through conduits.

Preferably, at least one of the fluid movers can be aimed from side to side or aimed directly into the center of the building. The height of the movers could also be adjusted, or the aim could be adjusted vertically as well as horizontally to have multiple degrees of freedom once extended into the main pit chamber. How the fluid movers are aimed could be adjusted manually, hydraulically, electrically, pneumatically or any other method of actuation.

The method for extending the fluid outlets or fluid moving device into the pit could be done several ways, some of which will be described. In these examples, the fluid movers have the ability to move further into the manure pit through mechanical means.

Some options for extending the manure moving devices further into the main chamber could include one or more of the following.

- A pivoting frame or pipe 210, the end 212 of which rotates from mostly vertical to mostly horizontal into the pit 102, preferably closer to the floor 103 as it rotates out away from the main vertical structure of the unit. The end of the pivoting frame or pipe 210 could have at least one fluid mover (propeller, nozzle, or the like) 214 or 216 rotatably mounted to it, to make it aimable in any direction. See FIGS. 9-14 and 17-19.
- A scissor mechanism 310 folded compact against the device's main frame when lowered into the pit 102. When actuated, the scissor mechanism 310 extends laterally into the main chamber of the pit 102, on which is mounted at least one aimable fluid moving device 314. See FIGS. 15-16.
- A telescoping frame or pipe 410 that is in a retracted state when being lowered into the pit opening 112, and then extended outward into the main chamber of the pit 102. Mounted anywhere on this telescoping structure 410 is an aimable fluid moving device 414. See FIGS. 20-21.
- The main vertical frame being lowered into the pit 102 could be sectioned such that the entire frame could fold outward into the pit 102. Either the tip of the framework could fold further into the main pit chamber 102, or the frame could fold in half and the pivot points) moves further into the pit chamber 102, leaving one portion mostly under the pit opening. Essentially, there could be any number of pivoting sections of the boom, some of which can be articulated to present a fluid moving device outward into the main pit chamber 102.

Actuation of all mechanical movement could be achieved by any means known to one skilled in the art, such as (but not limited to) hydraulic or pneumatic motors or cylinders, electric servos or linear actuators, cable and winch, hand crank, etc.

Each method could have a pump moving further into the pit or staying below the pit opening as is typical of current devices.

Each method could agitate the pit and pump fluid up and out of it through a conduit. Pumping could happen separately from agitation or in conjunction with it.

Powering the device 120 could come from any means or any number or combination of power transfer means. A standalone engine could run a hydraulic pump or PTO shaft that goes into the pit. A tractor PTO could run the fluid pump directly through a series of drivelines and gear boxes or transfer cases, or the tractor PTO could drive a hydraulic pump. Electric motors could also be used to power any fluid moving component directly, or power a driveline or hydraulic motor to transfer power to the fluid movers.

The trailer version of this device 120 could include an articulating load stand boom 108 for filling tanks. This amounts to a hollow tube or pipe 108 that can be moved into different vertical and horizontal positions so the outlet of the pipe can be positioned so manure tanks can drive underneath it for filling. The pipe 108 could be made from any material, but this design is made of steel for strength and durability. The pipe 108 could get into position through any power transfer method such as hydraulic actuators, motors, pneumatics, electric motors, actuators, or servos, etc. Positioning the pipe 108 could happen through means like rotating, pivoting, articulating boom sections, telescoping, compliant bending, or the like. See FIG. 1.

Figure 22:
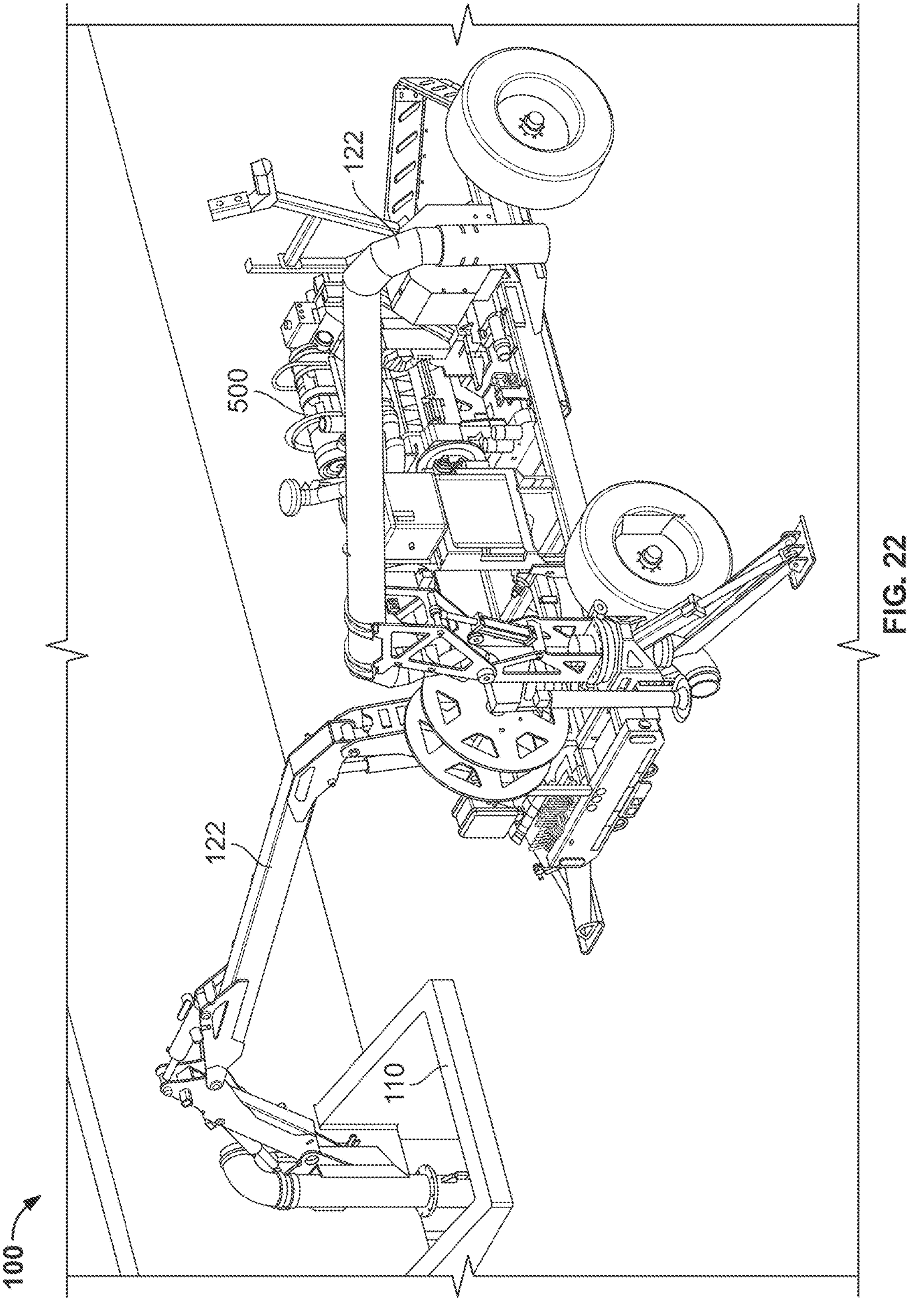
FIG. 22 shows another example environment with a device including an agitation boom with a structure mechanism, where the device is self-propelled.
Figure 23:
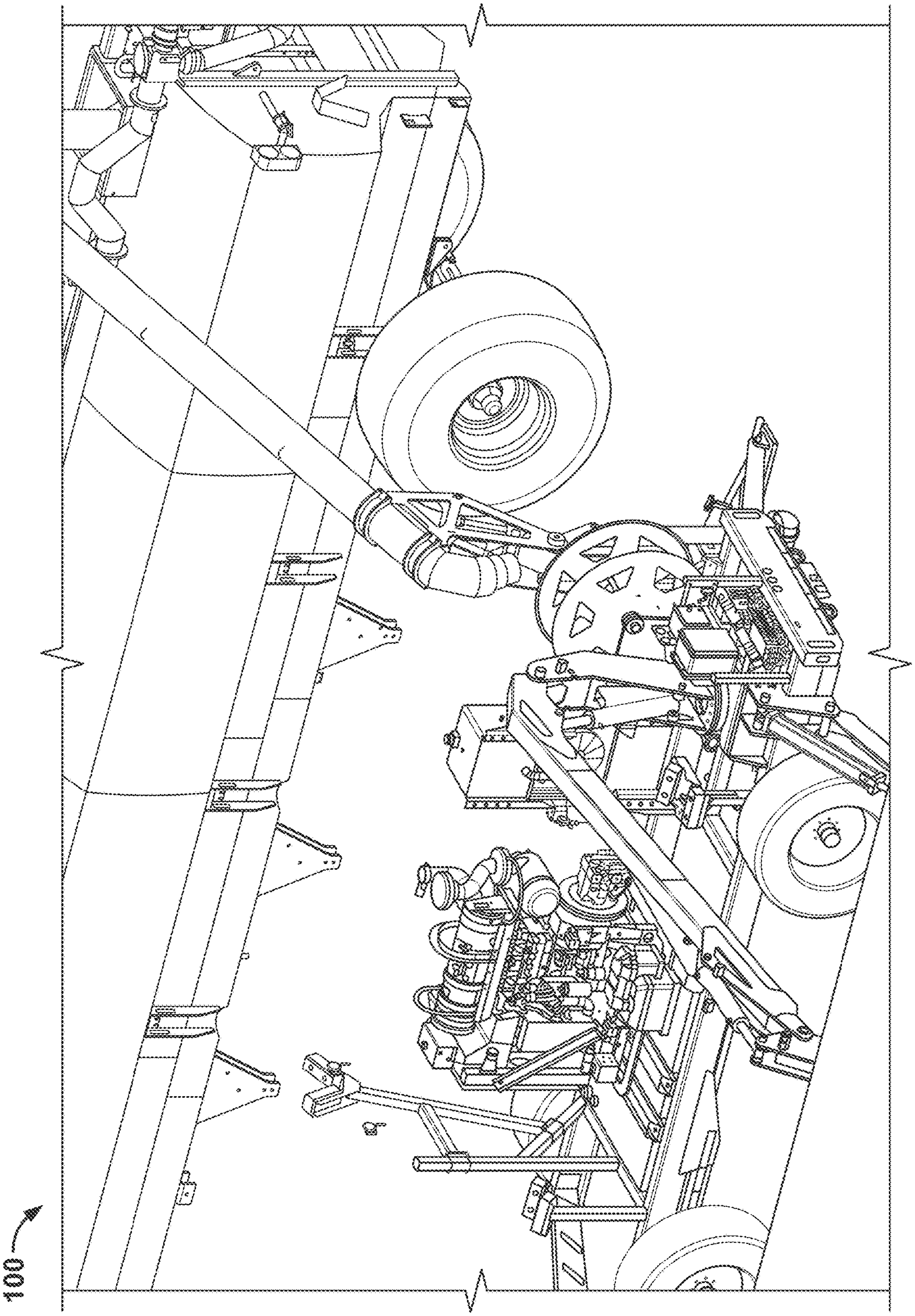
FIG. 23 shows another view of the device of FIG. 22 with a boom positioned to fill a manure tanker.

This example load stand boom 108 could also have the ability to detach from its "road travel trailer" 500 and move through self-propulsion or other means to a position on site that is more convenient for driving large tanks under for filling. See FIGS. 22-23. Not every pumping site has the pump-outs located near the driveway for the tanks to get underneath a built-in load stand boom 108 if it is fixed to the trailer or pump vehicle 500. The ability to haul the load stand conveniently on the trailer, but then detach to locate closer to the tank driveway solves both problems with current methods (slow/dangerous road travel and having 2 pieces of equipment to move from site to site.

In the examples shown, agitating with a pump and nozzle (s) with valves can have different configurations to direct the flow up a pipe or out the nozzle(s) in any combination. The nozzles have multiple degrees of freedom side-to-side and vertically up and down. The submersible pump is configured for pumping fluids with solid materials and sand, but this type of pump would not be required. The submersible pump is also a centrifugal type with two tangential outlets. But the type of pump and outlet configuration could be of any type that moves fluids.

For more efficient travel from site-to-site and between pump-out locations around a building or lagoon, the described examples can exhibit multiple improvements to aid in both functions. These examples could also be applied to other agitation or pumping sites like open lagoons, not just deep pit buildings. Non-limiting examples include in ground storage pits, above ground storage structures, storage underneath a confinement building, and lagoons (created with dirt and lined like a pond).

Such example devices could have a means of agitation attached to them that could be lowered into the liquid, such as one or more of the following.

- A trailer style unit that can be pulled by any towing vehicle using a hitch, but also has a ground engaging propulsion method for local movement around a pumping site (not for driving on the road). The addition of self-propulsion could be through any means of power transfer from power unit to the ground. The ground propulsion method may disengage from the ground for towing on free-wheeling tires, or have a method of unlocking the drive train to enable the ground propulsion method to free-wheel for towing.
- A self-propelled vehicle 500 for local movement around a pumping site (not for driving on the road) that drives on and off a trailer for movement between sites. Once towed to the site on a trailer, an end user then drives the pumping/agitation vehicle off a trailer to the pumping location. See FIGS. 22-23.

Both types of propulsion may be powered through internal combustion engine through a mechanical drive train, hydraulic pumps and motors, electric motors, or the like.

The propelled vehicle 500 may engage the ground using one or more tires, tracks, walking legs, or the like.

The propelled vehicle 500 can have features built in for steering and maneuverability in many ways. Steering could allow pivoting or spinning the vehicle in place, steering caused by a direction change of ground engaging elements on any location on the vehicle (front, back, sides corners, centered), skid steering style most typical of tracked and fixed wheeled vehicles, etc. The mechanism of steering is not defined, only that elements in the design cause the vehicle to maneuver in various directions and degrees of freedom.

Control of both propulsion methods could be done with a ride-on driving method or through any remote control means. One envisions a natural improvement of remote control could be automated movement to and from the pump-outs using GPS, Real-Time Kinematic Positioning, Radio frequency locating, Cellular data, Bluetooth, Wi-Fi, etc. to drive autonomously to the pump-out or edge of a lagoon and start working with minimal or no human interference in the process.

There can be various advantages to the examples provided herein. These can include one or more of the following.

- Agitation ability: This solution, able to agitate further into confinement buildings, solves problems with capacity decreasing over time due to solids buildup that never gets removed.
- Tank loading convenience: This solution having a built-in tank loading pipe boom that stays with the pump/agitation vehicle or detaches solves problems of road travel speed and safety inherent with the long pipe load stands used today. This is also a single integrated piece of equipment rather than two separate items having to be hauled over the road.
- Self-propulsion on job sites: Due to limitations of ground conditions and accessibility around pump sites (buildings, lagoons, etc.) a means for self-propelling a pumping/agitating vehicle from a driveway/road to its working location without driving a tractor or truck/trailer is beneficial. Total system weight would be decreased, users could haul multiple units on one trailer to a job site quickly and could access buildings or lagoon edges in ways other units cannot. A slow moving tractor that is difficult to haul between job sites can be minimized, and each device can have an individual power source.

Many alternatives to the examples provided herein are possible.

Indicators of fluid moving direction can be built onto the agitation device, showing which way the fluid moving devices are pointing when submerged.

All functions described herein can be controlled remotely via web or mobile interface via cellular or Wi-fi connection, line of site radio controls, Bluetooth devices, GPS, Real-Time Kinematic Positioning, etc.

All power transfer methods can be considered in any combination using technology such as Internal combustion engines, hydraulics, pneumatics, electrical components, batteries, etc.

More automation of all functions or Artificial Intelligence can be used to make systems more efficient, smarter, and provide more data to end users. Details such as nutrient content monitors, density monitors, or sonar could be used to measure the manure or slurry makeup or see underneath the liquid surface to identify settles solid mounds to target.

When solids become suspended in the liquid the density and nutrient content increases quickly but soon becomes homogenous. Monitoring density or nutrients over time would enable an end user to know when the pit has been sufficiently agitated to begin the pumping process. Also monitoring details like pit depth and off-gassing above the manure are considered to enable end users to closely watch or receive warnings off-site when these reach pre-set thresholds.

The examples can be used for more than just manure agitation, such as other slurry mixing or pumping for mining operations, lake/pond management, and/or dredging.

What is claimed is:

1. A fluid moving device for manure agitation in a pit located beneath a confinement building, the fluid moving device comprising:
- a boom configured to extend vertically into a pump-out wall of the pit, the boom including a first actuator configured to raise and lower a pump into the pit;
- a pivoting pipe coupled to the boom, the pivoting pipe having a proximal end and a distal end, wherein the pivoting pipe is configured to pivot from a substantially vertical orientation to a substantially horizontal orientation to extend into a main chamber of the pit, and wherein the distal end of the pivoting pipe performs the manure agitation;
- a second actuator coupled to the pivoting pipe and configured to actuate pivoting of the pivoting pipe between the substantially vertical orientation and the substantially horizontal orientation; and
- at least one rotational coupling to rotate the distal end of the pivoting pipe, wherein the at least one rotational coupling comprises:
  - a first rotational coupling configured to rotatably mount a nozzle to the distal end of the pivoting pipe to permit rotation of the nozzle about a substantially vertical axis; and
  - a second rotational coupling configured to permit the nozzle to rotate about a substantially horizontal axis to adjust an aim of the nozzle vertically.

2. The fluid moving device of claim 1, wherein the first rotational coupling and the second rotational coupling provide the nozzle with multiple degrees of freedom for agitation.

3. The fluid moving device of claim 1, wherein the boom includes the pump.

4. The fluid moving device of claim 1, further comprising an integrated load stand configured to extend from the fluid moving device to a filling tank.

5. The fluid moving device of claim 4, wherein the integrated load stand comprises an articulating boom configured to move the integrated load stand into different vertical and horizontal positions.

6. The fluid moving device of claim 1, wherein the boom comprises a telescoping boom configured to lower the pump to a bottom of the pit.

7. The fluid moving device of claim 1, wherein the pivoting pipe is configured such that the distal end of the pivoting pipe is positioned closer to a floor of the pit when in the substantially horizontal orientation than when in the substantially vertical orientation.

8. The fluid moving device of claim 1, wherein the distal end of the pivoting pipe is aimable in any direction when the pivoting pipe is in the substantially horizontal orientation.

9. The fluid moving device of claim 1, wherein the distal end of the pivoting pipe is configured to be aimed toward a center of the confinement building or side-to-side parallel to side walls of the pit.

10. The fluid moving device of claim 1, wherein the pivoting pipe is configured to deliver fluid to the distal end.

11. The fluid moving device of claim 1, wherein the first actuator and the second actuator are hydraulic cylinders.

12. A fluid moving device for manure agitation in a pit located beneath a confinement building, the fluid moving device comprising:
- a boom configured to extend vertically into a pump-out wall of the pit, the boom including a first actuator configured to raise and lower a pump into the pit;
- a pivoting pipe coupled to the boom, the pivoting pipe having a proximal end and a distal end, wherein the pivoting pipe is configured to pivot from a substantially vertical orientation to a substantially horizontal orientation to extend into a main chamber of the pit, and wherein the distal end of the pivoting pipe performs the manure agitation;
- a second actuator coupled to the pivoting pipe and configured to actuate pivoting of the pivoting pipe between the substantially vertical orientation and the substantially horizontal orientation;
- at least one rotational coupling to rotate the distal end of the pivoting pipe; and
- an integrated load stand configured to extend from the fluid moving device to a filling tank.

13. The fluid moving device of claim 12, wherein the integrated load stand comprises an articulating boom configured to move the integrated load stand into different vertical and horizontal positions.

14. The fluid moving device of claim 12, wherein the boom comprises a telescoping boom configured to lower the pump to a bottom of the pit.

15. The fluid moving device of claim 12, wherein the pivoting pipe is configured such that the distal end of the pivoting pipe is positioned closer to a floor of the pit when in the substantially horizontal orientation than when in the substantially vertical orientation.

16. The fluid moving device of claim 12, wherein the distal end of the pivoting pipe is aimable in any direction when the pivoting pipe is in the substantially horizontal orientation.

17. The fluid moving device of claim 12, wherein the distal end of the pivoting pipe is configured to be aimed toward a center of the confinement building or side-to-side parallel to side walls of the pit.

18. The fluid moving device of claim 12, wherein the pivoting pipe is configured to deliver fluid to the distal end.

19. The fluid moving device of claim 12, wherein the first actuator and the second actuator are hydraulic cylinders.

* * * * *